Feb. 23, 1932.　　　A. F. LA FON　　　1,846,125
AIRCRAFT ELEVATING AND PROPELLING MECHANISM
Filed March 25, 1930
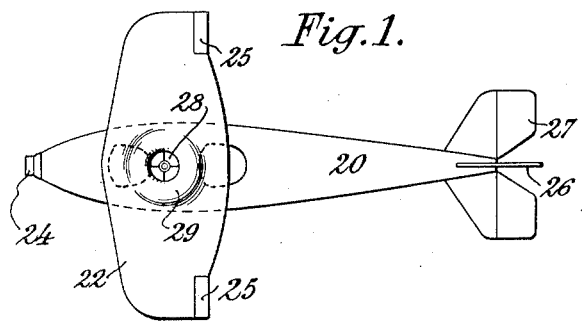
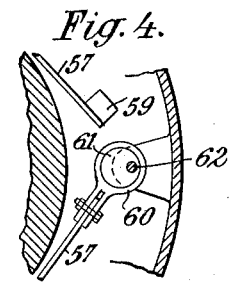
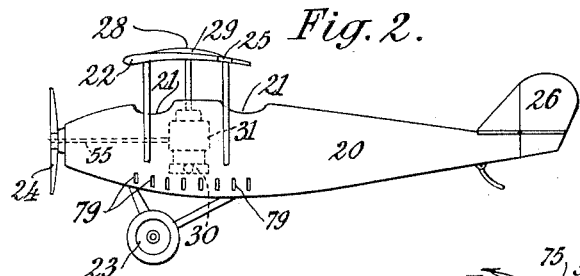
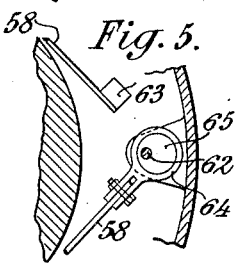
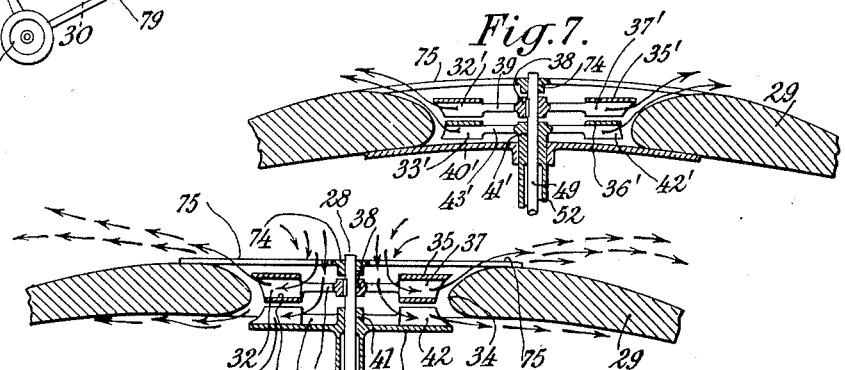
INVENTOR:
Alphonse F. La Fon,
By Attorneys,
Fraser, Myers & Manley.

Patented Feb. 23, 1932

1,846,125

UNITED STATES PATENT OFFICE

ALPHONSE F. LA FON, OF NEW YORK, N. Y.

AIRCRAFT ELEVATING AND PROPELLING MECHANISM

Application filed March 25, 1930. Serial No. 438,670.

This invention relates to improvements in elevating and propelling mechanism for aircraft. It is herein disclosed as applied to an airplane of the heavier-than-air type having the usual fuselage, lifting and sustaining surfaces, ailerons, and horizontal and vertical rudders.

One object of the invention is to provide a machine of the above-described character with a blower mounted for rotation about a vertical axis and a surrounding, fixed, aerofoil structure of such shape and location that the blast of air from the blower will create a difference of pressure between the upper and lower surfaces of the aerofoil structure adapted to serve as an elevating and sustaining force whereby the machine may be directly lifted from the ground without being dependent upon forward motion. In the preferred form of the invention the blower by which the elevating and sustaining force is created should comprise two relatively movable elements mounted concentrically one above the other so that each will neutralize the torque of the other and their gyroscopic effects will be balanced.

It is a further object of the invention to provide a machine of the above-described character with a propeller and an aerofoil construction to cooperate therewith as an elevating and sustaining element when the machine is advanced at a relatively high velocity, the blower and the propeller being connected with a single driving motor through the intermediary of differential gearing by means of which the energy of the engine may be variably applied to propulsion or to elevation at the will of the pilot.

Other advantages of the invention will be made clear by the following detailed description.

In the accompanying drawings illustrating the preferred and modified forms of the invention,—

Figure 1 is a plan view of an aircraft having the invention applied thereto.

Fig. 2 is a side view of the same craft.

Fig. 3 is a view, partly in side elevation and partly in cross-section, showing the engine, propeller, elevating and sustaining device, and transmission mechanism by which said parts are connected.

Fig. 4 is a large-scale detail diagram conventionally representing mechanism whereby the upper brake-band of the differential gearing indicated in Fig. 3 may be tightened and released.

Fig. 5 is a similar conventional representation of mechanism whereby the lower brake-band may be tightened and released.

Fig. 6 is a conventional representation of a two-way pawl-and-ratchet device whereby the shaft of the brake device illustrated in Fig. 3 may be held in a position in which either brake mechanism will be effective.

Fig. 7 is a representation of a modified form of elevating and sustaining device in which the entire blast of air from the blower is directed over the aerofoil structure instead of being divided by said structure so as to flow above and below the same as indicated in Fig. 3.

Referring first to Figs. 1 and 2, the invention in its preferred form is indicated as applied to a monoplane which may in general be of the usual construction, comprising a fuselage 20 having one or more cockpits 21, an elevating and sustaining plane 22, landing gear 23, a propeller 24, and the usual steering, elevating, depressing and horizontal and transverse stabilizing devices comprising ailerons 25 and vertical and horizontal rudders 26, 27.

One important feature of the invention consists in mounting a blower 28 in the plane 22 and in modifying the surrounding portion of the aerofoil structure 29 of the plane in such manner that the blast of air from the blower will create a difference in pressure between the upper and lower surfaces of the aerofoil structure by which the craft may be lifted vertically from the ground and sustained. This novel elevating and sustaining device may, if desired, be used in a machine having a propeller of the usual type by which the craft may be moved forwardly, and the propeller and movable element of the elevating and sustaining device may be connected with a single engine 30 (Fig. 2) through suitable gearing 31.

Referring now to Fig. 3 of the drawings, the blower 28 is illustrated in its preferred form as comprising two centrifugal fans 32, 33, rotatable in opposite directions so as to neutralize the reactions due to their acceleration and retardation as well as their gyroscopic effects. These fans should preferably be located within an opening 34 in the aerofoil structure 29 forming a specially modified portion of the airplane structure 22. The upper fan 32 may comprise upper and lower walls 35, 36, spaced by driving vanes 37, the whole structure being open at the center and supported from a hub 38 by a spider or open framework 39. The lower fan may comprise a lower wall 40 extending inwardly to the hub 41 and driving vanes 42 also supported from said hub 41 by a stiffening spider or framework 43.

The two fans 32, 33 may be so positioned with respect to the surrounding aerofoil structure 29 and the upper and lower surfaces of the aerofoil structure may be so shaped as to cause air drawn downwardly and into the central portion of the blower from above and then forced outwardly by the vanes 37 and 42 to be divided by the surrounding aerofoil structure into two blasts, one passing over the aerofoil structure and the other beneath it. The surfaces of the aerofoil structure may also be of such shape as to cause the outwardly-directed blast of air above the structure to create a zone of reduced pressure along the upper surface extending outwardly from the opening 34, and to cause the outwardly-directed blast which passes beneath the aerofoil structure to create a zone of increased pressure along its corresponding under surface. This difference in pressure is indicated diagrammatically by the arrows representing the direction of the air currents in Fig. 3 of the drawings.

The engine or motor 30 may be connected with the fans 32, 33 and with the propeller 24 by differential gearing and controlling devices whereby the energy of the motor may be variably applied either to elevating and sustaining alone or to propulsion, as will now be made clear.

As best indicated in Fig. 3 of the drawings, the engine-shaft 44 may be fixedly connected with a driving element 45 connected by bevel gears 46 with a pair of differential gears 47, 48. The gear 47 may be fixedly connected by a driving shaft 49 with the hub 38 of the fan-blower 32. The gear 47 may also be connected through a train of reversing gears 50, 51 and a hollow shaft 52 with the hub 41 of the fan-blower 33, the gears 50 of the train of reversing gears being rotatably mounted upon bearings 53 fixedly secured to the walls of the gear-case 54.

From the foregoing description it will be apparent that the rotation of the gear 47 by the driver 45 of the differential gear will cause the blowers 32 and 33 to be rotated in opposite directions at equal velocities.

The differential gear 48 may be connected with the shaft 55 of the propeller 24 by means of a bevel gear 56 so that the propeller will be rotated whenever the differential gear 48 is rotated by the driver 45.

In order that the energy of the motor may be variably applied to the rotation of the fan-blowers or to the rotation of the propeller at will, suitable means are provided whereby the movement of either of the differential gears 47, 48 may be restrained at will. To this end the differential gears are provided, respectively, with brake-bands 57, 58, either of which may be brought into frictional contact with its associated differential gear while the other remains free.

In Figs. 4 and 5 are conventionally represented devices by which the application of the brake-bands may be controlled. As indicated in Fig. 4, one end of the brake-band 57 may be fixedly secured to an anchor-post 59 whereas the other end may be secured to a strap 60 of an eccentric 61 secured to a brake-shaft 62.

As indicated in Fig. 5, one end of the lower brake-band 58 may be secured to an anchor-post 63 and the other end secured to the strap 64 of an eccentric 65 fixedly mounted on the brake-shaft 62.

The brake-shaft 62 may be provided with a suitable hand-wheel 66 (Fig. 3) by which it may be turned, and it may be held after rotation in either direction to tighten one or the other of the two brake-bands by means of a two-way pawl-and-ratchet device conventionally illustrated in Fig. 6, said device comprising a ratchet 67 fixedly secured to the brake-shaft and a double-armed pawl 68 pivotally connected as at 69 to any fixed part of the neighboring structure.

It will be apparent that the two brake-bands need not necessarily be subject to control by a single operating member, but when so connected as conventionally indicated in Figs. 4 and 5 the two eccentrics 61 and 65 should be so relatively positioned on the brake-shaft 62 that one will be caused to tighten the brake-band which it controls as the brake-band controlled by the other is loosened. When in intermediate positions the energy of the motor may be divided, part being applied to propulsion due to the rotation of the differential gear 48 and part being applied to elevation and suspension by rotation of the differential gear 47.

On rotation of the brake-wheel 66 in one direction the lower brake-band may be tightened so as to restrain the rotation of the differential gear 48, whereby any desired proportion of the energy of the motor may be applied to rotation of the differential gear 47, thus causing the fan-blowers 32 and 33 to be more forcibly rotated in opposite directions.

On rotation of the brake-wheel 66 in the opposite direction the upper brake-band may be tightened so as to restrain the rotation of the differential gear 47 and cause any desired proportion of the energy of the motor to be directed to the rotation of the differential gear 48 which drives the propeller 24.

If desired, the brake may be of a sufficient capacity to permit either of the differential gears 47 and 48 to be brought to rest and held at rest so that the entire energy of the motor may be directed to the rotation of the other gear and the driving element connected therewith.

The various rotatable parts of the mechanism illustrated in Fig. 3 may be supported upon appropriate bearings preferably of the anti-friction type. The main motor-shaft 44 may be supported upon a thrust-bearing 70 below the motor, and the driver 45 of the differential gearing may be fixedly secured to said motor-shaft. The differential gears 47 and 48 may be separated from the driver 45 by anti-friction bearings 71, 72, and the differential gear 48 may be supported on a thrust-bearing 73. The shaft 49 connected with the differential gear 47 may be steadied at its upper end by a bearing 74 supported by bracing-rods 75 from surrounding portions of the aerofoil structure 29. The hollow shaft 52 which carries the fan-blower 33 may be provided at its lower end with a two-way thrust-bearing 76, 77, the former adapted to support the shaft and blower when running at low velocities and the latter adapted to transfer the lifting force from the lower blower element to the upper part of the gear-case when the blower is being rotated at high velocities. A thrust-bearing 78 may also be provided to reduce the friction between the propeller-shaft 55 and the part of the structure in which it is mounted when the craft is being advanced by the rotation of the propeller.

If desired, the walls of the fuselage may be provided with suitable ports or openings 79 (Figs. 2 and 3) in advance of and to the rear of the motor to receive and discharge air whereby the motor cylinders may be cooled either directly or through the intermediary of any appropriate radiating device (not shown).

In Fig. 7 is represented a modified form of the invention in which the elevation and suspension of the craft is dependent upon a blast of air all of which is directed over the aerofoil structure. This form of the invention differs from the preferred form heretofore described in that the opening in the aerofoil structure 29 is closed at the bottom by a wall or partition 40' having an opening at the center to receive the hub 41' of the hollow shaft 52. The blower, which, as in the preferred form, may be of the duplex type, is represented as comprising an upper fan 32' having an upper wall 35' and vanes 37'. The blower may also comprise a lower fan 33' having an upper wall 36' and vanes 42'. The fans may be supported from hubs 38 and 41' by spiders 39 and 43', respectively.

On rotation of the blowers in opposite directions the blast of air will be deflected slightly upwardly along the inner surfaces of the aerofoil structure 29 surrounding the opening in which the blower is housed, and as this blast of air flows outwardly and upwardly over the upper surface of the aerofoil structure it will, in a well-known manner, create a zone of reduced pressure over the structure so that the normal pressure acting against its under surface may serve as an elevating and sustaining force.

The operation of the machine as a whole should be apparent from the foregoing detailed description. When starting the machine the brake-wheel 66 will be turned in a direction such as to tighten the lower brake-band so as to prevent rotation of the differential wheel 48. On starting the motor the differential wheel 47 will be rotated, thus causing fans 32 and 33 to be rotated in opposite directions through the reversing gearing connected with the gear 47. The resulting difference in pressure between the upper and lower surfaces of the aerofoil structure 29 created by the blast of air generated by the blower will cause the aircraft to rise vertically from the ground. The elevating force will be increased by suction of air from above into the centrally-disposed intake of the blower, which will tend to reduce the pressure on the upper surfaces of the blower and to increase the pressure along the under surface of the wall 41 of the fan 33.

After the craft has been lifted to the desired height by rotation of the fans 32 and 33, the brake-wheel 66 may be gradually rotated in a direction such as to release the brake-band controlling movements of the differential gear 48, thus permitting a part of the energy of the motor to be caused to rotate the propeller 24. As the energy of the motor is thus applied to propulsion the speed and energy of the fans 32, 33 will gradually decrease. This variation in the application of the energy of the motor may be increased to any desired extent by further rotation of the brake-wheel until ultimately, if desired, the brake-band 57 of differential gear 47 may be caused to bring said gear to rest and hold it at rest, after which the entire energy of the engine will be applied to the rotation of the propeller 24, which will cause the craft to be rapidly advanced so as to be controlled by the operation of the ailerons and vertical and horizontal rudders in the usual maner, the extended portions of the aerofoil structure 22 being relied upon as an elevating and sustaining means.

When it is desired to descend, the brake-wheel may be rotated in a direction such as to release the brake-band 57 which controls the movement of the differential gear 47 and to tighten the brake-band 58 which controls the movement of the differential gear 48, as a result of which the propeller 24 may be gradually brought to rest and the fans 32 and 33 again set in motion. The elevating and sustaining effort of the fans may be reduced to any desired degree by the throttle and other usual controlling means by which the speed of the motor may be varied at will. In this manner the sustaining effort of the blower may be reduced to such extent as to permit the craft to be lowered at the desired rate.

By appropriately apportioning the application of energy of the motor between the rotation of the propeller and the rotation of the fans the craft may be elevated, moved forwardly, steered in any desired direction, and brought to rest at any desired point.

The invention is not intended to be limited to the exact forms herein selected for purposes of illustration, but should be regarded as covering modifications and variations thereof within the scope of the appended claims.

What is claimed is:—

1. An aircraft comprising a centrifugal blower mounted for rotation about a vertical axis and having an intake closed at the bottom and open at the top, and an aerofoil structure surrounding the periphery of said blower, the upper surface of said structure being so shaped and located with respect to the blower as to cause its outwardly-directed blast of air to create a zone of reduced pressure above the upper surface of the aerofoil structure whereby the relatively greater pressure on its lower surface may be made available as an elevating and sustaining force.

2. An aircraft as defined by claim 1 of which the blower comprises two elements concentrically mounted one above the other and provided with means whereby they may be rotated in opposite directions.

3. An aircraft as defined by claim 1 having its blower mounted within the aerofoil structure in a position such that its outwardly-directed blast of air may be divided thereby, thus causing part to flow over and part to flow under the same, the surfaces of the aerofoil structure being of such shape as to cause the divided air blast to create a zone of reduced pressure above its upper surface and a zone of increased pressure below its lower surface whereby the difference in pressure may be caused to serve as an elevating and sustaining force.

4. An aircraft having means comprising a rotary device to create an elevating and sustaining force, a rotary propeller to create a tractive force in a direction substantially perpendicular to that of said elevating and sustaining force, an engine, and differential gearing through which either or both of said rotary devices may be driven by said engine.

5. An aircraft as defined by claim 4 having a brake by which the movement of the element of the differential gearing connected with the rotary propeller may be restrained so as to cause the greater part of the energy of the engine to be applied to the element of the differential gearing connected with the other rotary device by which an elevating and sustaining force may be created.

6. An aircraft as defined by claim 4 having a brake by which the movement of the element of the differential gearing connected with the rotary device for creating an elevating and sustaining force may be restrained so as to cause the greater part of the energy of the engine to be applied to the element of the differential gearing connected with the rotary propeller.

7. An aircraft as defined by claim 4 having a brake by which the element of the differential gearing connected with the rotary propeller may be brought to rest and held at rest so as to cause the entire available energy of the engine to be applied to the element of the differential gearing connected with the other rotary device by which an elevating and sustaining force may be created.

8. An aircraft as defined by claim 4 having a brake by which the element of the differential gearing connected with the rotary device for creating an elevating and sustaining force may be brought to rest and held at rest so as to cause the entire available energy of the engine to be applied to the element of the differential gearing connected with the rotary propeller.

9. An aircraft as defined by claim 4 having a brake by which the movement of the element of the differential gearing connected with the rotary propeller may be restrained, a second brake by which the movement of the element of the differential gearing connected with the other rotary device for creating an elevating and sustaining force may be restrained, and means whereby either brake may be rendered effective and the other ineffective, so that the greater part of the energy of the engine may be selectively directed either to elevating and sustaining the craft or to its propulsion.

10. An aircraft as defined by claim 4 having a brake by which the element of the differential gearing connected with the rotary propeller may be brought to rest and held at rest, a second brake by which the element of the differential gearing connected with the rotary device for creating an elevating and sustaining force may be brought to rest and held at rest, and means whereby either brake may be rendered effective and the other ineffective, so that the entire available energy of the engine may be selectively directed either to elevating and sustaining the craft or to propulsion.

11. An aircraft as defined by claim 4 of which the rotary device to create an elevating and sustaining force comprises two relatively movable elements and means connecting said elements with one of the elements of the differential gearing for rotation thereby in opposite directions.

12. An aircraft comprising a blower, a propeller, an engine, power transmission means whereby the energy of the engine may be applied to the driving of the blower alone, or to the driving of the propeller alone, or divided between the two in any desired ratio at will, and an aerofoil structure including a portion of such shape and location that the blast of air from the blower will create a difference of pressure between its upper and lower surfaces available for use as an elevating and sustaining force and a portion to react against the atmosphere as the craft is moved by the propeller and likewise serve as an elevating and sustaining element.

13. An aircraft as defined by claim 12 of which one portion of the aerofoil structure merges with and forms an extension of the other.

14. An aircraft as defined by claim 1 of which the closure at the bottom of the intake for the blower is an integral part of a rotatable element of the blower the under surface of which may be effective as an elevating and sustaining surface, said rotatable element having a thrust bearing to transmit its lifting force to the remainder of the craft.

In witness whereof, I have hereunto signed my name.

ALPHONSE F. LA FON.